United States Patent [19]

Kroupa et al.

[11] Patent Number: 4,511,620
[45] Date of Patent: Apr. 16, 1985

[54] METHOD FOR PREVENTION OF BUBBLE FORMATION IN POLYORGANOSILOXANE GELS

[75] Inventors: Loretta A. Kroupa; Patricia G. Agbomeirele, both of Midland, Mich.

[73] Assignee: Dow Corning Corporation, Midland, Mich.

[21] Appl. No.: 625,939

[22] Filed: Jun. 29, 1984

[51] Int. Cl.³ .................. B05D 3/02; B05D 7/24; B32B 27/08; B32B 27/28
[52] U.S. Cl. .................... 428/220; 427/387; 427/407.1; 427/407.2; 427/412.1; 428/425.5; 428/429; 428/447; 428/448
[58] Field of Search ............ 428/220, 447, 448, 429, 428/425.5; 427/387, 407.1, 407.2, 412.1

[56] References Cited

U.S. PATENT DOCUMENTS

| | | | |
|---|---|---|---|
| 3,284,406 | 11/1966 | Nelson | 260/46.5 |
| 3,708,225 | 1/1973 | Miach et al. | 351/160 |
| 4,128,299 | 12/1978 | Maher | 350/96.13 |
| 4,264,681 | 4/1981 | Girard et al. | 428/429 |
| 4,455,691 | 6/1984 | Redinger et al. | 428/447 X |

*Primary Examiner*—Evan K. Lawrence
*Attorney, Agent, or Firm*—Robert Spector

[57] ABSTRACT

Bubble formation at the interface between an organosiloxane gel that is curable by a hydrosilation reaction and a substrate possessing potential nucleation sites for bubbles can be prevented if the substrate is first coated with an uncured extrudable silicone rubber composition that is curable by hydrosilation reaction in addition to being compatible with and adherent to the gel. The gel is then applied over the uncured silicone rubber composition and the two materials are concurrently cured. The cured rubber composition exhibits a durometer hardness value of at least 10 on the Shore A scale.

14 Claims, No Drawings

METHOD FOR PREVENTION OF BUBBLE FORMATION IN POLYORGANOSILOXANE GELS

BACKGROUND OF THE INVENTION

1. Field of the Invention

This invention relates to polyorganosiloxane gel materials. More particularly, this invention relates to the prevention of bubble formation in polyorganosiloxane gel materials at interfaces between the gel and substrates possessing potential nucleation sites where bubble formation is likely to occur.

2. Background Information

Cured polyorganosilanes exhibiting a gel type character are disclosed in the prior art, for example in U.S. Pat. No. 3,284,406 which issued to Nelson on Nov. 8, 1966, and in copending U.S. patent application Ser. No. 592,481, filed on Mar. 23, 1984. The polyorganosiloxane gel materials disclosed in these documents are prepared by reacting at least one polydiorganosiloxane containing terminal vinyl groups and a benzene soluble resinous organosiloxane copolymer containing $SiO_2$, $(CH_3)_3SiO_{1/2}$ and $CH_2=CH(CH_3)_2SiO_{1/2}$ units with at least one polyorganosiloxane containing at least three silicon-bonded hydrogen atoms per molecule. The curable reaction mixture may also include at least one polydiorganosiloxane containing two silicon-bonded hydrogen atoms, one at each of the two terminal positions of the molecule, as a chain extending reactant. These types of polyorganosiloxane compositions are cured in the presence of a platinum-containing catalyst.

Cured polyorganosiloxane gels are characterized as being relatively soft and deformable in comparison to polyorganosiloxane elastomers and resins. The cured gels are typically too soft to exhibit hardness values on any of the Shore durometer scales. Polyorganosiloxane gels are often characterized in terms of penetration values that are typically expressed as the depth to which the surface of the gel is depressed by a specified loading applied for a specified time interval. Typical penetration values are within the range of from 1 to 10 mm or higher under a loading of 20 g. applied over a five second interval.

Polyorganosiloxane gels are used in numerous applications, including mammary prosthesis, as damping media and for the encapsulation of delicate electronic devices and circuits to protect them against damage by moisture and mechanical shocks. The use of polyorganosiloxanes as the light transmitting medium for a compressible optical waveguide device is disclosed in U.S. Pat. No. 4,128,299, which issued to J. Maher on Dec. 5, 1978, and in the copending U.S. patent application Ser. No. 592,481 referred to hereinbefore.

For some of the foregoing applications, it is mandatory that the cured gel remain optically clear and free of bubbles or other defects that could alter the optical transmittance of the gel. It has been found when the gel is cured in contact with a substrate, such as the surface of a molded or extruded object containing contour variations or irregularities, these variations and irregularities can serve as nucleation sites at which gases dissolved or entrapped within the gel form bubbles. The gas can be air that becomes entrapped when the substrate is coated or otherwise contacted with the gel or can result from gaseous products generated within the gel during or following the curing reaction. The gels disclosed in the aforementioned patent to Nelson can generate gaseous hydrogen by cleavage of silicon-hydrogen bonds. Irrespective of the means by which gaseous materials arrive within the gel, bubble formation can occur when these gaseous materials contact potential nucleation sites present on the substrate. The relatively high elasticity of the gel allows bubbles to expand to the extent that they irreversibly alter the optical properties of the cured gel. The gel or the entire device must then be replaced, a costly and time consuming procedure.

One unsuccessful approach we used in trying to solve the problem of bubble formation was attempting to increase the degree of curing of the gel in the area adjacent to the substrate by coating the substrate with organosiloxane materials containing three or more silicon-bonded hydrogen atoms per molecule. A second unsuccessful approach was to coat the substrate with an organosiloxane primer considered useful for improving the adhesion of polyorganosiloxane compositions curable by a hydrosilation reaction.

SUMMARY OF THE INVENTION

The present invention is based on the discovery that bubble formation at the interface between an polyorganosiloxane gel that is curable by a hydrosilation reaction and a substrate for bubbles can be prevented if the substrate is first coated with an uncured extrudable silicone rubber composition that is curable by a hydrosilation reaction in addition to being compatible with and adherent to the gel. The gel is then applied over the uncured silicone rubber composition and the two materials are concurrently cured. The cured rubber composition exhibits a durometer hardness value of at least 10 on the Shore A scale.

DETAILED DESCRIPTION OF THE INVENTION

This invention provides a method for preventing the formation of bubbles at the interface between a polyorganosiloxane gel that is cured by a platinum catalyzed hydrosilation reaction and a substrate, said method comprising the steps of, (I) coating said substrate with a first layer comprising an uncured extrudable silicone rubber composition that is compatible with said gel and is curable by a platinum-catalyzed hydrosilation reaction to yield a silicone rubber exhibiting a durometer hardness of at least 10 on the Shore A scale, the thickness of said first layer being greater than 3 mm, (II) applying to said first layer a second layer comprising said polyorganosiloxane gel in an uncured form, and (III) curing said first and second layers substantially concurrently to obtain a unitary, cured composite.

This invention further provides a composite consisting essentially of a substrate that is coated on at least one surface with a layer of silicone rubber which has been cured by a platinum catalyzed hydrosilation reaction, where said layer exhibits a thickness of at least 3 mm and is cohesively bonded to a layer of polyorganosiloxane gel which has been cured by a platinum catalyzed hydrosilation reaction.

It should be understood that the gel layer can be considerably thicker than the silicone rubber layer. The present method is intended to encompass coating one or more interior surfaces of a container with a layer of extrudable silicone rubber composition prior to filling the container with a curable polyorganosiloxane gel composition.

The polyorganosiloxane gels that are used in accordance with the present method can be any of those disclosed in the prior art, including the aforementioned patent to Nelson. Preferred gel compositions are exemplified hereinafter and in the aforementioned copending U.S. application Ser. No. 592,481. Typically, the curable gel composition contains at least one diorganovinylsiloxy endblocked polydiorganosiloxane (A) that exhibits a viscosity of from 0.1 to 50 Pa·s at 25° C. and at least one polyorganohydrogensiloxane (B) containing an average of at least 3 silicon-bonded hydrogen atoms per molecule and an effective amount of a platinum-containing catalyst. Preferably the maximum viscosity of (A) is 35 Pa·s at 25° C.

The organic radicals other than vinyl that are bonded to the silicon atoms of (A) and (B) can be hydrocarbon or substituted hydrocarbon radicals. Useful hydrocarbon radicals include alkyl containing from 1 to 20 carbon atoms, cycloalkyl and aryl radicals such as phenyl. Typical nonreactive substituents that can be present on silicon-bonded hydrocarbon radicals include halogen atoms, particularly fluorine, and cyano groups. The silicon-bonded organic groups are preferably lower alkyl, phenyl or 3,3,3-trifluoropropyl. Methyl is particularly preferred based on the cost and availability of these polydiorganosiloxanes and the intermediates used to prepare them.

The polydiorganosiloxanes (A) are essentially linear molecules that may contain some branching resulting from trifunctional and tetrafunctional units that can be present as impurities in the polymers. Because of the manner in which (A) is prepared, some molecules may contain more than two vinyl radicals per molecule and some of the vinyl groups may not be located at the terminal positions of the polymer molecules. Reactant (A) can be a single polydiorganosiloxane or a mixture of two or more polydiorganosiloxanes wherein the viscosity of the mixture is from 0.1 to 50 Pa·s at 25° C.

The curing agent (B) for the polyorganosiloxane gels of this invention are organohydrogensiloxanes that contain an average of at least three silicon-bonded hydrogen atoms per molecule, no vinyl or other ethylenically unsaturated hydrocarbon radical, and an average of no more than one hydrogen atom per silicon atom. The remaining valences of the silicon atoms of (B) are satisfied by divalent oxygen atoms or by monovalent saturated hydrocarbon radicals as disclosed hereinbefore for (A). The organohydrogensiloxanes can be homopolymers, copolymers, or mixtures thereof and may contain one or more units of the formulae $RSiO_{3/2}$, $R_2SiO$, $R_3SiO_{1/2}$ and $SiO_{4/2}$ in addition to one or more types of hydrogen-containing units of the formulae $RHSiO$, $HSiO_{3/2}$ and $R_2HSiO_{1/2}$. In these formulae, R represents any of the aforementioned monovalent hydrocarbon radicals.

Depending upon the physical properties required in the cured gel, in addition to (B) there can be present at least one difunctional curing agent in the form of a polyorganosiloxane containing an average of two silicon-bonded hydrogen atoms per molecule. Preferably the difunctional curing agent is a polydiorganosiloxane containing a silicon-bonded hydrogen atom at each of the two terminal positions of the molecule.

Typically, the molar ratio of silicon-bonded hydrogen atoms to vinyl or other ethylenically unsaturated hydrocarbon groups present in the uncured gel composition is at least 0.3 to 1 and can be up to 0.9 to 1, depending upon the properties desired in the final gel. If difunctional curing agents are present, these can provide up to 90% or more of the available silicon-bonded hydrogen atoms and the ratio of total silicon-bonded hydrogen to vinyl groups can be up to 3 to 1 or higher. In preferred curable gel compositions, the molar ratio of silicon-bonded hydrogen atoms to vinyl groups is from 1.8 to 2.9 and difunctional curing agents provide from 80 to 95 mol percent of this total.

If it is desired to increase the tear resistance or puncture resistance of the cured gel or make it more resilient, one method for accomplishing this is to include up to 25%, based on the weight of (A), of a resinous organosiloxane copolymer containing repeating units of the formulae (a) $R_2^1(CH_2=CHSiO_{0.5}$, (b) $R_3^2SiO_{0.5}$ and (c) $SiO_{4/2}$ where $R^1$ and $R^2$ are lower alkyl containing from 1 to 4 carbon atoms or phenyl, with the proviso that at least 95% of $R^1$ and $R^2$ are methyl. Most preferably all the $R^1$ and $R^2$ groups are methyl. The molar ratio of the combined (a) and (b) units to (c) units is from 0.6:1 to 1.1:1. Units represented by formula (a) constitutes from 2 to 8% by weight of the resin and the resin preferably contains at least two vinyl groups per molecule of copolymer. In a preferred species of organopolysiloxane resin, the ranges for the ratio of (a) to (b) to (c) units it 5–10:40–45:45–50, with the proviso that the concentration of (a) units does not exceed about 8%, based on resin weight.

Resinous copolymers containing the aforementioned (a), (b) and (c) units can be prepared as described in U.S. Pat. No. 2,676,182, issued to Daudt and Tyler, which is hereby incorporated in its entirety by reference. The copolymers described in this patent contain from 2 to 3 percent by weight of hydroxyl groups, which is considerably above the maximum level of 0.3 weight percent desired for the resinous copolymer component of the present invention. The hydroxyl content of the resin is conveniently reduced to the desired level by employing a higher concentration of triorganosiloxane capping agent, or a precursor thereof, than the concentration range taught in the aforementioned U.S. Pat. No. 2,676,182. Briefly, this method comprises reacting under acidic conditions a silica hydrosol with organosubstituted siloxanes, such as hexamethyldisiloxane, or hydrolyzable triorganosilanes such as trimethylchlorosilane. To prepare the resins of this invention, the desired amount of the appropriate vinyl-containing silazane, siloxane or silane would also be present in the reaction mixture.

U.S. Pat. No. 4,162,242, which issued to Lee, Maxson and Stebleton on July 24, 1979, disclose extrudable silicone rubber compositions that are suitable substrate coating materials in connection with the present invention. These coating materials are applied to substrates having potential bubble nucleation sites when in contact with the polyorganosiloxane gels described hereinbefore. Extrudable silicone rubber compositions contain the same types of vinyl terminated polyorganosiloxanes and organohydrogensiloxane reactants present in the gels, with the exception that the difunctional crosslinking agent used in gels are usually not present in extrudable silicone rubber compositions.

Although the reactants used to prepare the gel and silicone rubber materials of this invention are similar, the relative concentrations of silicon-bonded hydrogen atoms and vinyl groups differ. Uncured gel compositions typically contain a stoichiometric excess of vinyl groups, that can be up to 1.5 fold or higher, with respect to the number of silicon-bonded hydrogen atoms present on those organohydrogensiloxanes containing an average of at least three silicon-bonded hydrogen atoms per molecule. In uncured silicone rubber formulations, the molar ratio of vinyl groups to silicon-bonded hydrogen atoms is close to unity. Typically there is a stoichiometric excess of silicon-bonded hydrogen atoms relative to vinyl groups.

The extrudable silicone rubber compositions of this invention optionally contain a reinforcing silica filler to increase the tensile strength and durometer hardness of the cured elastomer. One preferred type of silicone rubber composition is transparent and does not contain silica.

The cured elastomer should exhibit a durometer hardness on the Shore A scale of at least 10. In addition, the extrudable silicone rubber composition and the gel composition must be compatible and form a cohesive bond when cured in contact with one another. As used herein, the term "compatible" implies that when placed in contact with one another a layer of uncured extrudable silicone rubber and a layer of uncured gel can form a continuous boundary that is substantially free of voids.

In contrast to the uncured gel, the uncured extrudable silicone rubber composition has sufficient integrity and thixotropic character that it will not flow to any appreciable extent under ambient conditions and maintains its initial shape on a horizontal surface.

While not wishing to be bonded by this theory, it is believed that the strong adhesion between the cured gel and silicone rubber layers and the relatively high durometer hardness value of the rubber are responsible for preventing any gases that may be dissolved or entrapped within the gel from forming bubbles.

To function effectively, the uncured layer of extrudable silicone rubber should be at least 3 mm thick prior to application of the gel. The accompanying examples demonstrate that thinner layers of curable silicone rubber composition will not prevent bubble formation in gels that are cured in contact with the rubber composition. A thickness range of from 3 to about 10 mm is preferred. Thicker coatings will not appreciably increase the efficacy of the coating as a barrier against bubble formation.

To achieve the maximum compatability and adhesion between the silicone rubber and gel layers, it is preferable that the silicon-bonded hydrocarbon groups in both materials be identical. As disclosed hereinabove, most preferably all of these hydrocarbon groups are methyl with the exception of the vinyl groups that are used to cure these materials.

Both the silicone rubber coating and the gel are cured by a hydrosilation reaction involving silicon-bonded vinyl or other ethylenically unsaturated hydrocarbon groups with silicon-bonded hydrogen atoms. This reaction is typically catalyzed by platinum metal or a compound thereof. Other metals in the platinum group of the periodic table, such as rhodium and palladium, and compounds thereof may also be effective catalysts for curing the present polyorganosiloxane gels and silicone rubbers under certain conditions. In many instances the platinum group metals are considered equivalent catalysts for hydrosilation reactions, and therefore within the scope of the present method.

Typically, a concentration of catalyst equivalent to from 0.1 to about 100 parts by weight of platinum per million parts by weight of curable composition is sufficient to catalyze a hydrosilation reaction at temperatures from 25 to 100° C. The catalyst can be any of the compatible platinum catalysts known to catalyze the addition of silicon-bonded hydrogen atoms to silicon-bonded vinyl radicals. Platinum catalysts can be any of the known forms which are compatible such as platinic chloride, salts of platinum, chloroplatinic acid and various complexes. Many of these platinum catalysts are described in U.S. Pat. No. 3,697,473 which is hereby incorporated by reference to show platinum catalysts. One preferred class of platinum catalysts is described in U.S. Pat. No. 3,419,593 which is hereby incorporated by reference to show the preparation of this class of platinum catalysts and provide additional catalyst descriptions. Of the class of platinum catalysts described in U.S. Pat. No. 3,419,593, the most preferred is a reaction product of chloroplatinic acid and a vinylsiloxane having at least two dimethylvinylsiloxy units per molecule, with any additional siloxane units being dimethylsiloxane.

Preferred extrudable silicone rubber compositions are disclosed in the aforementioned U.S. Pat. No. 4,162,243, which is incorporated herein in its entirety by reference. The vinyl-terminated polydiorganosiloxanes in these compositions are mixtures of polydimethylsiloxanes that collectively provide a molecular weight distribution such that there is present at least one polymeric species (1) at a concentration greater than the concentrations of polymeric species of lower and higher molecular weight. Polymeric species (1) is described as having a peak molecular weight, determined by gel permeation chromatography in the range of from 68,000 to 135,000. The molecular weight of the lowest molecular weight polymeric species is in the range of from 854 to 3146 and the molecular weight of the highest molecular weight species is in the range of from 174,000 to 370,000. The mixture of the various polymeric species present have a molecular weight distribution such that the dispersity index of the composition has a value greater than 3.8.

The optional reinforcing silica filler used in some of the present extrudable silicone rubber compositions is a finely divided fume or precipitated type that is typically treated to prevent crepe hardening of the composition. Treating agents that can be employed are well known in the art and include silanes and siloxanes containing hydroxyl or other hydrolyzable groups on the molecule. Preferably the silicon atoms on the surface of the treated silica particles are bonded to trimethylsiloxy groups and vinyl-containing siloxy groups of the formula (a) $CH_2=CH(CH_3)_2SiO[(CH_3)_2SiO]_x-$, (b) $CH_2=CH(CH_3)(C_6H_5SiO[(CH_3)_2SiO]_x-$ where x is an integer from 0 to 20 and/or (3) siloxy groups consisting essentially of the repeating units

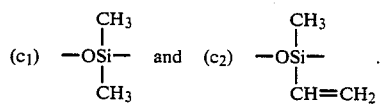

The toughness and durometer hardness of the cured silicone rubber can be increased by including from 10 to 50%, based on the weight of vinyl endblocked polydiorganosiloxane, of the same type of benzene-soluble resinous organosiloxane copolymer described hereinbefore in connection with the gel compositions.

Both the polyorganosiloxane gel and extrudable silicone rubber compositions described hereinabove will begin to cure when all of the ingredients, including the platinum-containing catalyst are mixed together. In accordance with the present method, it is desirable to delay curing of the extrudable silicone rubber composition and the gel until these two materials are placed in contact with one another, at which time both materials are cured concurrently. It is therefore usually desirable to inhibit the ambient temperature activity of the platinum catalyst in both the gel and silicone rubber compositions of this invention, but allow the platinum to effectively catalyze the curing of both materials at temperatures above about 50° C.

One suitable type of platinum catalyst inhibitor is described in U.S. Pat. No. 3,445,420 to Kookootsedes et al. which is hereby incorporated by reference to show certain acetylenic inhibitors and their use. A preferred class of acetylenic inhibitors are the acetylenic alcohols, especially 2-methyl-3-butyn-2-ol.

A second type of platinum catalyst inhibitor is described in U.S. Pat. No. 3,989,667 to Lee and Marko which is hereby incorporated by reference to show certain olefinic siloxanes, their preparation and their use as platinum catalyst inhibitors.

A third type of platinum catalyst inhibitor is a polymethylvinylcyclosiloxane having three to six methylvinylsiloxane units per molecule.

The optimum concentration of platinum catalyst inhibitor is that which will provide the desired storage stability at ambient temperature without excessively prolonging the time interval required to cure the compositions at elevated temperatures. This amount will vary widely and will depend upon the particular inhibitor that is used, the nature and concentration of the platinum-containing catalyst and the nature of the organohydrogensiloxane.

Inhibitor concentrations as low as one mole of inhibitor per mole of platinum will in some instances yield a satisfactory level of storage stability and desirable curing period. In other cases, inhibitor concentrations of up to 10, 50, 100, 500 or more moles per mole of platinum may be needed. The optimum concentration for a particular inhibitor in a given composition can be determined by routine experimentation.

Substrates that can be coated using the extrudable silicone rubber compositions described hereinbefore include both organic and inorganic materials possessing sites at which any gaseous materials contained in the gel compositions of this invention could form bubbles. The potential nucleation sites can be surface contours or irregularities such as those occurring during fabrication of the substrate, or can result from objects such as electronic components being affixed to a substrate such as a printed circuit board. Adhesion between the substrate and the cured silicone rubber layer is not a requirement as it is between the cured silicone rubber and the adjacent layer of cured polyorganosiloxane gel composition.

Preferred substrates for use in accordance with the present method include synthetic organic polymers of the thermoplastic or thermosetting type. Polyurethane elastomers are particularly preferred on the basis of their physical and chemical properties.

The composites of this invention can be prepared by first coating a substrate with an uncured extrudable silicone rubber composition that is curable by a platinum catalyzed hydrosilation reaction. The thickness of this coating should be at least 0.3 cm. While the silicone rubber layer is still in an uncured form, an uncured organosiloxane gel composition that is curable by a platinum catalyzed hydrosilation reaction is placed over the silicone rubber layer and the rubber and gel are cured concurrently. Curing can be accomplished by heating the composite to a temperature of at least 50° C. or higher as may be required to activate the platinum curing catalyst.

The following examples disclose preferred embodiments of the present invention but should not be interpreted as limiting the scope of the accompanying claims. All parts and percentages are by weight unless otherwise specified.

EXAMPLE 1

The effect of substrate coatings on bubble formation was investigated using three gel filled containers. The containers were fabricated by adhering a transparent, flexible film to each side of a rectangular frame that was molded using a polyurethane elastomer. The frame measured 18 cm by 23 cm and was 0.5 cm thick. Prior to completing assembly of the three containers, the inner surfaces of two of the three frames, which constituted four of the six walls of the containers were coated with a layer of the extrudable silicone rubber composition described hereinbelow. Assembling of the containers was then completed and the three containers were filled with an organosiloxane gel composition prepared by mixing together the following ingredients to form a homogeneous composition.

35 parts of a dimethylvinylsiloxy endblocked polydimethylsiloxane (A) exhibiting a viscosity 30 Pa·s at 25° C.

8 parts of a dimethylvinylsiloxy endblocked polydimethylsiloxane (B) exhibiting a viscosity of about 0.4 Pa·s at 25° C.

36 parts of a 35 weight percent solution of a resinous benzene soluble organosiloxane copolymer in a dimethylvinylsiloxy terminated polydimethylsiloxane exhibiting a viscosity of about 2.1 Pa·s at 25° C. The organosiloxane copolymer contained repeating units of the formulae $(CH_2=CH)(CH_3)_2SiO_{1/2}$, $(CH_3)_3SiO_{1/2}$ and $SiO_{4/2}$ in a molar ratio of 0.09:0.8:1.0 and was prepared as described in U.S. Pat. No. 2,676,182. The copolymer contained 6.3% by weight of dimethylvinylsiloxy groups.

19 parts of a dimethylhydrogensiloxy endblocked polydimethylsiloxane containing an average of 13.3 dimethylsiloxane units per molecule.

0.4 part of a trimethylsiloxy endblocked dimethylsiloxane/methylhydrogensiloxane copolymer (C) containing an average of 62.5 mole percent methylhydrogensiloxane units and an average of 0.8 weight percent silicon-bonded hydrogen atoms, 0.18 part of a mixture of cyclic polymethylvinylsiloxanes, and 0.12 part of a chloroplatinic acid complex (D) of divinyltetramethyldisiloxane diluted with a liquid dimethylvinylsiloxy endblocked polydimethylsiloxane to achieve a platinum content of 0.7 weight percent.

The dimethylhydrogensiloxy endblocked polydimethylsiloxane provided 92 mol percent of the total silicon-bonded hydrogen atom content of the gel composition.

The contents of the three containers were deaired by applying a vacuum of 737 mm of mercury for 45 minutes. The containers were then placed in a two-part mold wherein the cavity had substantially the same dimensions as the container and the mold was placed in a circulating air oven for between 12 and 15 minutes to cure the gel and any other organosiloxane materials present. The oven temperature was 150° C. At the end of this period the mold was removed from the oven and allowed to cool to ambient temperature. At this time there were no observable bubbles in any of the three containers. After remaining under ambient conditions for at least 72 hours, the containers were placed in a circulating air oven for at least six hours. The oven temperature was 68° C. The containers were examined at one hour intervals to determine whether any bubbles were present. At the end of this heat test, the containers remained under ambient conditions for 24 hours and were then placed in a vacuum chamber for 6 hours under a vacuum of 279 mm of mercury and examined at hourly invervals. The containers were removed from the vacuum chamber, allowed to remain under ambient conditions for 24 hours, again placed for at least six hours in a circulating air oven maintained at a temperature of 68° C. and finally stored under ambient conditions for 24 hours.

The extrudable silicone rubber composition used to coat two of the three polyurethane frames of the containers was obtained by mixing the following ingredients referred to in the foregoing gel composition to form a homogeneous composition, 134 parts of polydimethylsiloxane (A)
66 parts of polydimethylsiloxane (B)
3.9 parts of copolymer (C)
0.44 part of chloroplatinic acid complex (D)
2.3 parts of a siloxane exhibiting the average formula

2.7 parts of a hydroxyl terminated polydimethylsiloxane exhibiting a viscosity of about 0.04 Pa·s at 25° C.
3.9 parts of water
15.5 parts of hexamethyldisilazane
69.5 parts of fume silica, and
0.05 part 2-methyl-3-butyn-2-ol as a catalyst inhibitor.

Polydimethylsiloxanes (A) and (B) collectively provided a molecular weight distribution such that there was present at least one polymeric species (1) at a concentration greater than the concentration of polymeric species of lower and higher molecular weight. Species (1) had a molecular weight, determined by gel permeation chromatography, within the range from 68,000 to 135,000, the lowest molecular weight species was within the range from 854 to 3146, the highest molecular weight species was within the range from 174,000 to 370,000 and the various polymeric species exhibited molecular weight distribution such that the dispersity index of said mixture was greater than 3.8.

When tested in accordance with ASTM Test Method No. D2240, the cured rubber exhibited a durometer hardness within the range from 38 to 48, measured on the Shore A scale.

The extrudable silicone rubber composition was applied to the inner surface of the polyurethane frame of two containers by extruding it through a circular nozzle measuring 0.3 cm in diameter. On one of the two frames the resultant bead was compressed by finger pressure to a thickness of about 0.15 cm. The bead of uncured rubber on the second frame was not compressed. The third frame was not coated with the extrudable silicone rubber composition and served as a control.

The cured gel in the container fabricated using the uncoated frame exhibited at least six small bubbles measuring about 0.3 cm. in diameter along the gel-frame interface following the first hour of the first heating cycle. During the test period in the vacuum chamber, the bubbles increased in diameter to between 0.6 and 2.5 cm. Some of the small bubbles coalesced into a single larger one during this test.

The cured gel in the container fabricated from the frame that had been coated with a 0.15 cm.-thick layer of extrudable silicone rubber did not exhibit any bubbles throughout the first heating cycle. At least six bubbles measuring from 0.6 to 2.5 cm. in diameter formed along the gel-frame interface during the test period in the vacuum chamber.

The cured gel in the container wherein the frame had been coated in accordance with the present method using a 0.3 cm.-thick layer of the extrudable silicone rubber composition did not exhibit any bubbles following completion of the two heating tests and one vacuum test described in this example.

As an additional test, the container prepared in accordance with the present method was exposed for 6 hours to a high humidity environment, 50° C. and 92% relative humidity, followed by 24 hours at ambient temperature and humidity and an additional six hour exposure to the high humidity. At the end of this period, there were no bubbles visible to the unaided eye anywhere in the gel.

EXAMPLE 2

This example discloses a preferred type of transparent extrudable silicone rubber composition that is a useful coating material for substrates with bubble nucleation sites.

A gel filled container was fabricated using the procedure and organosiloxane gel composition disclosed in the foregoing Example 1. The extrudable silicone rubber composition used to coat the inner surface of the frame was prepared by mixing together the following ingredients to form a homogeneous composition.

28 parts of a dimethylvinylsiloxy endblocked polydimethylsiloxane exhibiting a viscosity of about 30 Pa·s at 25° C.

73 parts of the benzene soluble organosiloxane copolymer described in Example 1. The copolymer was added as about a 75 weight percent solution in isomeric xylenes.

2.3 parts of the dimethylsiloxane/methylhydrogensiloxane copolymer identified as (C) in Example 1.

0.2 part of the chloroplatinic acid complex identified as (D) in Example 1, and 0.35 part of a mixture of cyclic polymethylvinylsiloxanes.

Prior to being placed in the container, the rubber composition was exposed to a partial vacuum to remove the xylene and other volatile materials present in the composition.

There were no bubbles visible anywhere in the gel following curing of the gel and the series of two heating tests and one vacuum test described in Example 1.

That which is claimed is:

1. A method for preventing the formation of bubbles at the interface between a polyorganosiloxane gel that is cured by a platinum catalyzed hydrosilation reaction and a substrate, said method comprising the steps of
   I. coating said substrate with a first layer comprising an uncured extrudable silicone rubber composition that is compatible with said gel and is curable by a platinum catalyzed hydrosilation reaction to yield a silicone rubber exhibiting a durometer hardness of at least 10 on the Shore A scale, the thickness of said first layer being greater than 3 mm;

II. applying to said first layer a second layer comprising said polyorganosiloxane gel in an uncured form; and III. curing said first and second layers substantially concurrently to obtain a unitary, cured composite.

2. A method according to claim 1 where said polyorganosiloxane gel in an uncured form comprises the product obtained by mixing A. at least one diorganovinylsiloxy endblocked polydiorganosiloxane exhibiting a viscosity of from 0.1 to 50 Pa·s at 25° C., B. at least one polyorganohydrogensiloxane containing an average of at least three silicon-bonded hydrogen atoms per molecule in an amount sufficient to cure said polyorganosiloxane gel, and C. platinum or a platinum compound in an amount sufficient to catalyze curing of said polyorganosiloxane gel.

3. A method according to claim 2 where said polyorganosiloxane gel in the uncured form includes at least one polydiorganosiloxane containing a silicon-bonded hydrogen atom at each of the two terminal positions, the molar ratio of silicon-bonded hydrogen atoms to vinyl groups present in said gel is from 1.8 to 2.9 and said polydiorganosiloxane provides from 80 to 95 mol percent of the silicon-bonded hydrogen atoms present in said gel.

4. A method according to claim 1 where silicon-bonded hydrocarbon radicals present in said uncured silicone rubber composition and said polyorganosiloxane gel are vinyl and methyl.

5. A method according to claim 2 where said polyorganosiloxane gel in the uncured form includes up to 25%, based on the weight of (A), of a resinous, benzene soluble copolymer consisting essentially of repeating units of the formulae (a) $(CH_3)_2CH_2\!=\!CHSiO_{0.5}$, (b) $(CH_3)_3SiO_{0.5}$ and (c) $SiO_{4/2}$ where the molar ratio of combined (a) and (b) units to (c) units is from 0.6:1 to 1.1:1, units represented by formula (a) constitute from 2 to 8% by weight of the copolymer, the copolymer contains at least two vinyl groups per molecule and the molar ratio of (a) to (b) to (c) units is 5–10:40–45:45–50, with the proviso that the concentration of (a) units does not exceed 8% of the total weight of said copolymer.

6. A method according to claim 1 where said extrudable silicone rubber composition comprises a mixture of vinyl terminated polydimethylsiloxanes that collectively provides a molecular weight distribution such that there is present at least one polymeric species (1) at a concentration greater than the concentrations of polymeric species of lower and higher molecular weight, said species (1) having a molecular weight, determined by gel permeation chromatography, within the range from 68,000 to 135,000, where the lowest molecular weight species is within the range from 854 to 3146, the highest molecular weight species is within the range from 174,000 to 370,000 and the various polymeric species exhibit a molecular weight distribution such that the dispersity index of said mixture is greater than 3.8. index greater than 3.8.

7. A method according to claim 1 where said extrudable silicone rubber composition and said uncured polyorganosiloxane gel composition include a platinum catalyst inhibitor.

8. A composite consisting essentially of a substrate, a polyorganosiloxane gel composition cured by a platinum catalyzed hydrosilation reaction and a layer of silicone rubber cured by a platinum catalyzed hydrosilation reaction where said layer is in contact with said substrate and separates it from said gel, said silicone rubber and said polyorganosiloxane gel are cohesively bonded, said silicone rubber layer exhibits a thickness of at least 3 mm and where the silicone rubber exhibits a durometer of at least 10 on the Shore A scale.

9. A composite according to claim 8 where said polyorganosiloxane gel composition in an uncured form comprises the product obtained by mixing A. At least one diorganovinylsiloxy endblocked polyorganosiloxane exhibiting a viscosity of from 0.1 to 30 Pa·s at 25° C., B. At least one polyorganohydrogensiloxane containing an average of at least three silicon-bonded hydrogen atoms per molecule in an amount sufficient to cure said polyorganosiloxane gel, and C. Platinum or a platinum compound in an amount sufficient to catalyze curing of said polyorganosiloxane gel composition.

10. A composite according to claim 9 where said polyorganosiloxane gel composition in the uncured form includes at least one polydiorganosiloxane containing a silicon-bonded hydrogen atom at each of the two terminal positions, the molar ratio of silicon-bonded hydrogen atoms to vinyl groups present in said gel is from 1.8 to 2.9 and said polydiorganosiloxane provides from 80 to 95 mol percent of the silicon-bonded hydrogen atoms present in said gel.

11. A composite according to claim 8 where silicon-bonded hydrocarbon radicals present in said uncured silicone rubber composition and said polyorganosiloxane gel composition are vinyl and methyl.

12. A composite according to claim 9 where said polyorganosiloxane gel composition in the uncured form includes up to 25%, based on the weight of (A), of a resinous, benzene soluble copolymer consisting essentially of repeating units of the formulae (a) $(CH_3)_2CH_2\!=\!CHSiO_{0.5}$, (b) $(CH_3)_3SiO_{0.5}$ and (c) $SiO_{4/2}$ where the molar ratio of combined (a) and (b) units to (c) units is from 0.6:1 to 1.1:1, units represented by formula (a) constitute from 2 to 8% by weight of the copolymer, the copolymer contains at least two vinyl groups per molecule and the molar ratio of (a) to (b) to (c) units is 5–10:40–45:45–50, with the proviso that the concentration of (a) units does not exceed 8% of the total weight of said copolymer.

13. A composite according to claim 8 where said extrudable silicone rubber composition comprises a mixture of vinyl terminated polydimethylsiloxanes that collectively provides a molecular weight distribution such that there is present at least one polymeric species (1) at a concentration greater than the concentrations of polymeric species of lower and higher molecular weight, said species (1) having a molecular weight, determined by gel permeation chromatography, within the range from 68,000 to 135,000, where the lowest molecular weight species is within the range from 854 to 3146, the highest molecular weight species is within the range from 174,000 to 370,000 and the various polymeric species exhibit a molecular weight distribution such that the dispersity index of said mixture is greater than 3.8.

14. A composite according to claim 8 where said extrudable silicone rubber composition and said uncured polyorganosiloxane gel composition include a platinum catalyst inhibitor.

* * * * *

UNITED STATES PATENT AND TRADEMARK OFFICE
CERTIFICATE OF CORRECTION

PATENT NO. : 4,511,620

DATED : April 16, 1985

INVENTOR(S) : Loretta A. Kroupa and Patricia G. Agbomeirele

It is certified that error appears in the above-identified patent and that said Letters Patent is hereby corrected as shown below:

Column 2, line 26 - Delete "for bubbles" and substitute therefor --- containing potential bubble nucleation sites --- .

Column 2, line 48 - Delete "greater than" and substitute therefor --- at least --- .

Column 4, line 14 - Delete "$R_2 1(CH_2=CHSiO_{0.5}$" and substitute therefor --- $R_2 1(CH_2=CHSiO)_{0.5}$ --- .

Column 4, line 25 - Delete "it" and substitute therefor --- is --- .

Column 4, line 50 - Delete "disclose" and substitute therefor --- discloses --- .

Column 6, line 52 - Delete "(3)"

Column 11, line 2 - Delete "greater than" and substitute therefor --- at least --- .

UNITED STATES PATENT AND TRADEMARK OFFICE
CERTIFICATE OF CORRECTION

PATENT NO. : 4,511,620

DATED : April 16, 1985

INVENTOR(S) : Loretta A. Kroupa and Patricia G. Agbomeirele

It is certified that error appears in the above-identified patent and that said Letters Patent is hereby corrected as shown below:

Column 11, line 61-Delete "index greater than 3.8".

Signed and Sealed this

Twenty-fourth Day of September 1985

[SEAL]

Attest:

Attesting Officer

DONALD J. QUIGG

Commissioner of Patents and Trademarks—Designate